(12) United States Patent
Komatsu (10) Patent No.: US 6,168,010 B1
(45) Date of Patent: Jan. 2, 2001

(54) APPARATUS AND METHOD FOR CONTROLLING VIBRATING FEEDER

(75) Inventor: Toshiyuki Komatsu, Shiga (JP)

(73) Assignee: Ishida Co., Ltd., Kyoto (JP)

( * ) Notice: Under 35 U.S.C. 154(b), the term of this patent shall be extended for 0 days.

(21) Appl. No.: 08/780,106

(22) Filed: Dec. 24, 1996

(30) Foreign Application Priority Data

Dec. 29, 1995 (JP) .................................................. 7-353717
Jan. 26, 1996 (JP) .................................................. 8-032879

(51) Int. Cl.$^7$ ................................................. B65G 25/00
(52) U.S. Cl. ......................... 198/751; 195/761; 195/769
(58) Field of Search ................................... 198/751, 761, 198/769

(56) References Cited

U.S. PATENT DOCUMENTS 4,441,060    4/1984    Hamer et al. .

FOREIGN PATENT DOCUMENTS 29 35 739    3/1981    (DE) .
37 40 919    6/1989    (DE) .
42 00 194    8/1993    (DE) .
58-16970     4/1983    (JP) .

OTHER PUBLICATIONS

Patent Abstacts of Japan, vol. 7, No. 103, May 6, 1983.
Patent Abstracts of Japan, vol. 8, No. 234, Oct. 26, 1984.
Patent Abstracts of Japan, vol. 12, No. 116, Apr. 13, 1988.
Patnet Abstracts of Japan, vol. 12, No. 8, Jan. 12, 1988.

*Primary Examiner*—Robert P. Olszewski
*Assistant Examiner*—Steven B. McAllister
(74) *Attorney, Agent, or Firm*—Staas & Halsey, LLP (57) ABSTRACT

A method and apparatus of controlling a vibrating feeder applies a drive signal to a vibrating mechanism connected to the vibrating feeder at a first predetermined power level, and subsequently applies the drive signal to the vibrating mechanism at a second predetermined power level which is greater than zero and lower than the first predetermined power level whereby an amplitude of vibration of the vibrating feeder converges towards a target amplitude. Another method and apparatus of controlling a vibrating feeder applies a drive signal having a phase to a vibrating mechanism connected to the vibrating feeder at a first phase and subsequently applies the drive signal to the vibrating mechanism at a second phase which is different from the first phase, whereby an amplitude of vibration of the vibrating feeder converges towards a target amplitude.

16 Claims, 9 Drawing Sheets

| NUMBER OF CYCLES | FIRING ANGLE (AMPLITUDE) |
|---|---|
| b1 | a1 |
| b2 | a2 |
| b3 | a3 |

FIG. 5B

| NUMBER OF CYCLES | FIRING ANGLE (AMPLITUDE) |
|---|---|
| b1 | a1 |
| b2 | a2 |

FIG. 5C

| NUMBER OF CYCLES | FIRING ANGLE (AMPLITUDE) |
|---|---|
| b1 | a1 |
| b2 | a2 |
| b4 | a4 |
| b3 | a3 |

APPARATUS AND METHOD FOR CONTROLLING VIBRATING FEEDER

BACKGROUND OF THE INVENTION

1. Field of the Invention

The present invention relates to a vibrating feeder, and more particularly, to controlling a vibrating feeder for feeding articles in weighing equipment.

2. Description of the Related Art

In conventional weighing equipment for weighing articles, a vibrating feeder is used to feed the articles to a weighing mechanism. The vibrating feeder is connected to a vibrating mechanism composed of an electromagnet to which power is fed from an AC power supply, a movable part, leaf springs and the like. The vibrating feeder is vibrated by the vibrating mechanism. An AC power supply is selectively applied to the electromagnet. When current passes through the electromagnet, an attractive force is applied to the movable part. By controlling the firing angle of the applied voltage, the vibrating feeder is vibrated to feed the articles on the feeder.

Figure 3A:
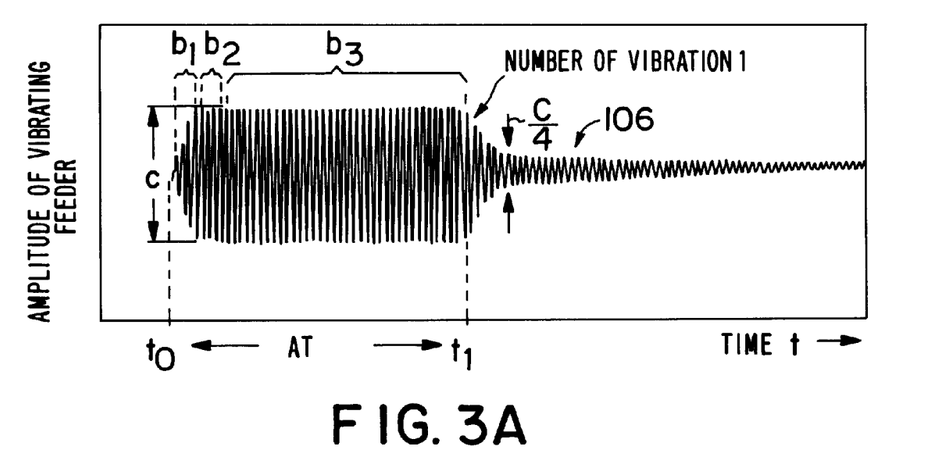
FIG. 3A is a chart showing states of amplitudes of a vibrating feeder according to the second and fourth aspects of the present invention.
Figure 3B:
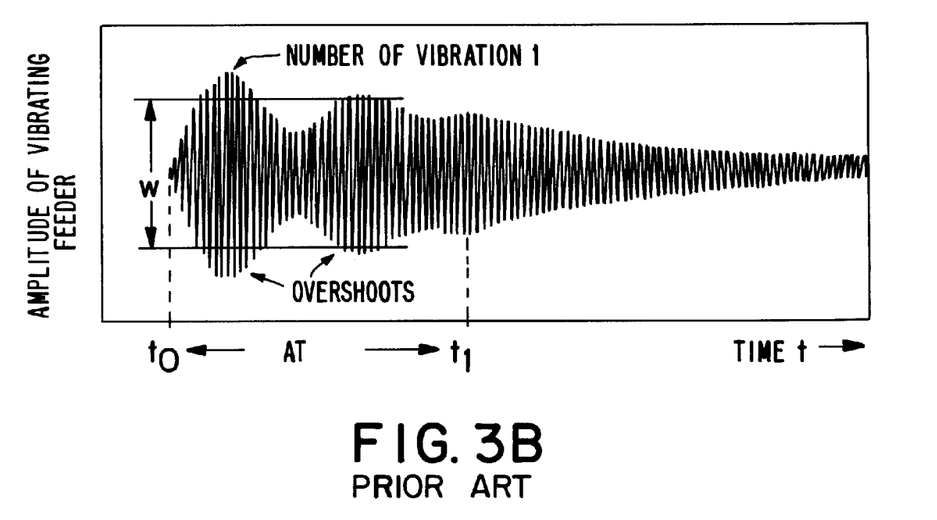
FIG. 3B (PRIOR ART) is a chart showing states of amplitudes of a conventional vibrating feeder.

In this case, the vibrating feeder obtains a large vibration force with less energy by the utilization of resonance. Referring to FIG. 3B, however, because the prior art vibrating feeder utilizes resonance, overshoots in which the amplitude of vibration exceeds a target amplitude W can occur. FIG. 3B illustrates such overshoots during a drive period AT which occurs between a start time t0 and a stop time t1. These overshoots are due to a transient response at the start time t0. Due to the occurrence of the overshoots, there has been a problem that the mechanical strength of the vibrating components has to be increased.

Although it is conceivable to detect the amplitude of the vibrating feeder to control it within the target amplitude W, a unit for that end has to be added, which complicates the structure and increases the cost.

On the other hand, a control method in which the overshoot is suppressed by gradually increasing the amount of power fed to the vibrating mechanism when it is started is known (Japanese Utility Model Publication No. 58-16970). However, this method has the problem that the target amplitude W is reached some time after the start time.

SUMMARY OF THE INVENTION

It is therefore an object of the present invention to provide a vibrating feeder which suppresses overshoots.

It is a further object of the present invention to provide a vibrating feeder having an excellent response at a start time of operations.

Yet another object of the present invention is to provide a vibrating feeder with a simple structure and reasonable cost.

The above objects are achieved in accordance with a first aspect of the present invention by providing a method of controlling a vibrating feeder including the steps of applying a drive signal to a vibrating mechanism connected to the vibrating feeder at a first predetermined power level; and subsequently applying a drive signal to the vibrating mechanism at a second predetermined power level which is greater than zero and lower than the first predetermined power level whereby the amplitude of vibration of the vibrating feeder converges towards a target amplitude.

The first aspect of the present invention provides an efficient and a simple method of controlling a vibrating feeder such that the amplitude of vibration is controlled to converge towards a target amplitude.

The method according to the present invention may be carried out at any time in a control procedure. For instance, the method may be employed during a drive period to change the target amplitude. Alternatively, the method may be employed at the end of a drive period. Preferably, however, the method is carried out at the start of a drive period, typically to control transient response at the start of the drive period. Typically, the drive signal is applied to the vibrating feeder in a series of drive periods, and the method is carried out at the start of each drive period.

The vibrating feeder may be controlled with feedback, but preferably, the method comprises an open-loop correction method, i.e., the first and second power levels are determined independently of the response of the vibrating mechanism to the applied drive signal.

Typically, the first power level corresponds to a steady-state amplitude of vibration of the vibrating feeder at or above the target amplitude. That is, if the vibrating feeder was driven at the first power level for a long period until it reaches a steady-state amplitude, then that amplitude would be at or above the target amplitude. This ensures that the amplitude of vibration converges rapidly towards the target amplitude. Typically, the second power level corresponds to a steady-state amplitude of vibration of the vibrating feeder below the target amplitude. This ensures that the amplitude of vibration of the vibrating feeder does not overshoot the target amplitude.

The drive signal may be generated in any suitable manner. In a preferable embodiment, the drive signal is generated by switching a power supply signal. Typically, the drive signal is cyclical, and is applied to the vibrating mechanism at the first and/or second power level over a predetermined number of cycles.

In accordance with a second aspect of the present invention, there is provided an apparatus for controlling a vibrating feeder connected to a vibrating mechanism. The apparatus includes a device for applying a drive signal to the vibrating mechanism at a first predetermined power level, and a device for subsequently applying the drive signal to the vibrating mechanism at a second predetermined power level which is greater than zero and lower than the first predetermined power level whereby the amplitude of vibration of the vibrating feeder converges towards a target amplitude.

Any suitable means for generating the drive signal may be employed. However, in a preferable embodiment, the apparatus further comprises a switching element for switching a power supply signal to generate the drive signal; and a firing angle control device for controlling the power level by controlling the firing angle of the switching element. Typically, the apparatus further comprises a control pattern storage device for storing a control pattern, wherein the firing angle control device controls the switching element in accordance with the control pattern.

In accordance with a third aspect of the present invention there is provided a method of controlling a vibrating feeder including the steps of applying a drive signal having a phase to a vibrating mechanism connected to the vibrating feeder at a first phase; and subsequently applying the drive signal to the vibrating mechanism at a second phase which is different to the first phase, whereby the amplitude of vibration of the vibrating feeder converges towards a target amplitude.

The third aspect of the present invention provides an alternative method of controlling a vibrating feeder, i.e., by varying the phase of the drive signal. The method may be carried out at any time in a control procedure. For instance, the method may be employed during a drive period to change the target amplitude. Alternatively, the method may be employed at the start of a drive period. Preferably, however, the method is carried out when the vibrating feeder is to be stopped. In this case the target amplitude is zero. This ensures a rapid reduction of amplitude when the vibrating feeder is to be stopped.

A feedback method may be employed, but preferably, the method comprises an open-loop correction method, i.e., the first and second phases are determined independently of the response of the vibrating mechanism to the applied drive signal. Typically, the power supply signal is applied to the vibrating mechanism in a series of drive periods, and the method is carried out at the end of each drive period.

The first and second phases may be offset by any chosen amount, but preferably the second phase is offset from the first phase by half a cycle. This ensures that the vibration is rapidly stopped.

Typically, the drive signal is generated by switching a power supply signal. Typically, the drive signal is applied to the vibrating feeder at the second phase over a predetermined number of cycles.

In accordance with a fourth aspect of the present invention there is provided apparatus for controlling a vibrating feeder connected to a vibrating mechanism. The apparatus includes a device for applying a drive signal having a phase to the vibrating mechanism at a first phase, and a device for subsequently applying the drive signal to the vibrating mechanism at a second phase which is different from the first phase whereby the amplitude of vibration of the vibrating feeder converges towards a target amplitude.

Typically, the apparatus comprises a switching element for switching a power supply signal to generate the drive signal; and a firing angle control device for controlling the phase of the drive signal by controlling the firing angle of the switching element.

Typically, the apparatus further comprises a zero-cross detecting device for detecting a zero-cross point of the power supply signal; and a phase switching device for switching the phase of the drive signal in response to the detected zero-cross point.

In all cases, the drive signal may be produced or derived from any suitable power supply, such as an AC power supply or a pulsating current power supply.

In a preferable embodiment, the methods according to both the first and third aspects of the present invention may be combined. In this case, the methods may be carried out simultaneously (i.e., the first and second power levels may also correspond with the first and second phases). Alternatively, the methods may be carried out sequentially in any order. The methods according to the first and third aspects of the present invention are typically employed to control transient response during a sequence of drive periods. Each method may be employed one or more times in a drive period. Similarly, the apparatus according to the second and fourth aspects may be preferably combined in a single apparatus.

In all cases, the method and apparatus are typically employed in a weighing device in which the vibrating feeder is used to feed articles. For instance, the vibrating feeder may comprise a distributing feeder in a combination weighing device. Alternatively, the vibrating feeder may feed articles into a pool hopper or onto a weighing table.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
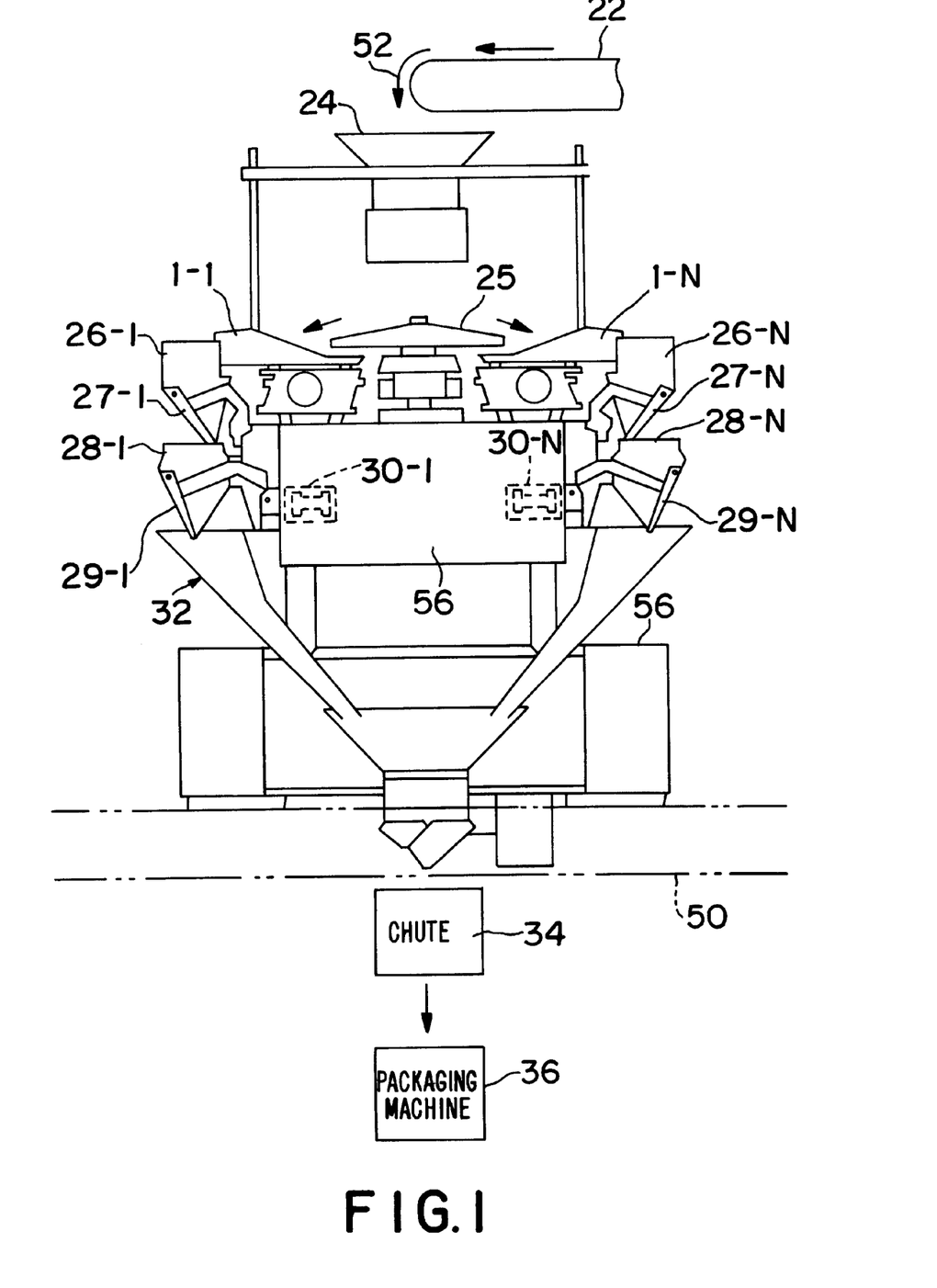
FIG. 1 is a side view showing combination weighing equipment using a vibrating feeder according to an embodiment of the present invention.

FIG. 1 is a schematic side view showing combination weighing equipment using a vibrating feeder controller according to the present invention. This equipment is supported on a base frame 50. Articles 52 sent from a supply belt 22 are collected at the center of a vibrating distributing feeder 25 via a supply chute 24. A number of vibrating feeder systems 1 (1-1 through 1-N) are disposed radially around the outer periphery of the distributing feeder 25 so as to receive the articles 52 distributed by the distributing feeder 25. The vibrating feeder systems 1 vibrate with a predetermined amplitude and number of cycles of vibration to feed the articles 52 in the radial direction.

Next, the articles 52 are fed to pool hoppers 26 (26-1 through 26-N) by the vibrating feeder systems 1. The articles 52 are pooled temporarily in pool hoppers 26 and are then fed into weighing hoppers 28 (28-1 through 28-N) by opening the discharge gates 27 (27-1 through 27-N) of the pool hoppers 26. Weight detecting device 30 (30-1 through 30-N), such as a load cell, measures the weight of the articles 52 put into each weighing hopper 28 and outputs a weight detection signal. Then, combinational computation is performed based on the weight detection signals to select the weighing hopper 28 in which the combinational weight of the articles is closest to a target weight. A discharge gate 29 (29-1 through 29-N) of that weighing hopper is opened and the articles are collected at a collecting chute 32 to be discharged to a discharge chute 34. The discharged articles 52 are packed by packing equipment 36 as packed goods having the target weight.

Figure 2:
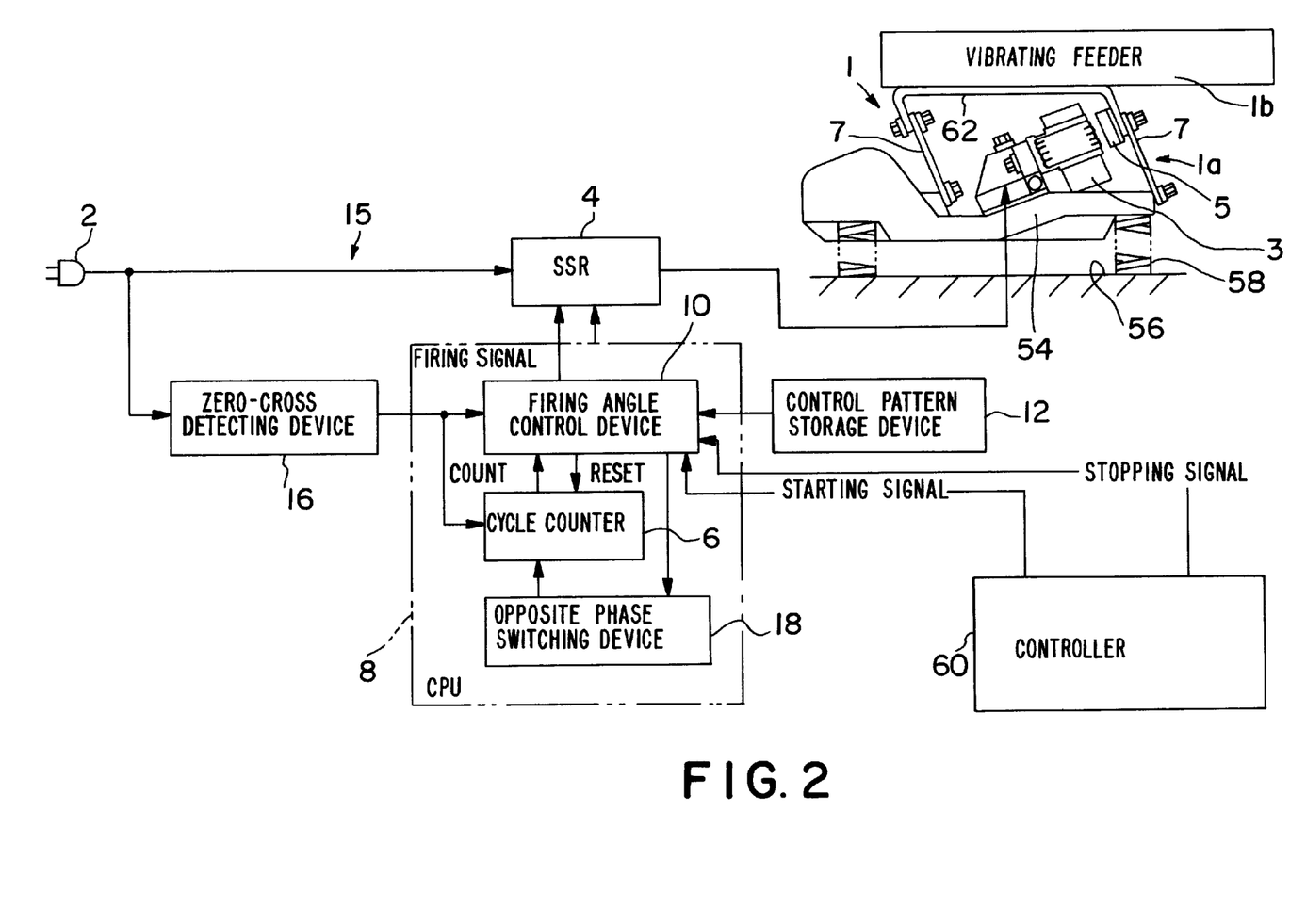
FIG. 2 is a structural view showing the controller of the vibrating feeder according to an embodiment of the present invention.

FIG. 2 is a structural view showing the controller of a vibrating feeder according to an embodiment of all aspects of the present invention. FIG. 2 shows a vibrating feeder system 1 comprising vibrating feeder 1b (which is in the form of a trough) and vibrating mechanism 1a, switching element 4, control pattern storage device 12, zero-cross detecting device 16 and CPU 8. The CPU 8 comprises a cycle counter 6, firing angle control device 10 and opposite phase switching device 18. The CPU 8 receives START/STOP signals from a controller 60.

The vibrating feeder 1b is connected to the vibrating mechanism 1a. The vibrating mechanism 1a comprises an electromagnet 3 to which power is fed from a commercial AC power supply 2 via the serially connected switch 4 which is typically a solid state relay (SSR). The signal which is fed into the SSR 4 from the power supply 2 is referred to herein as a power supply signal. The signal which is output from SSR 4 and applied to the electromagnet 3 is referred to herein as a drive signal.

Lower ends of a pair of leaf springs 7 at the front and rear respectively of the electromagnet 3 are fixed to a base 54 attached to a frame 56 of the weighing equipment via a vibration-proof elastic body 58. A bracket 62 is connected at the upper ends of the leaf springs 7 and a movable iron core 5 which faces the electromagnet 3 is fixed to this bracket 62. The vibrating mechanism 1a vibrates the vibrating feeder 1b to feed articles 52 on the vibrating feeder 1b. The vibrating mechanism 1a is driven by turning On/Off the power fed from the AC power supply 2 by the switching element 4. This enables the power and phase of the drive signal to be controlled by controlling the switching of the SSR 4. The natural frequency of the vibrating feeder system 1 is set around the frequency of the AC power supply to obtain a large amplitude of the vibrating feeder 1b with low power. The operation of this system will be explained below.

Figure 4A:
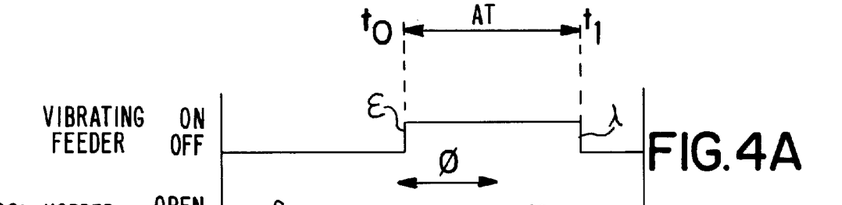
FIGS. 4A, 4B and 4C are charts showing operation timings of the vibrating feeder of the present invention.
Figure 4B:
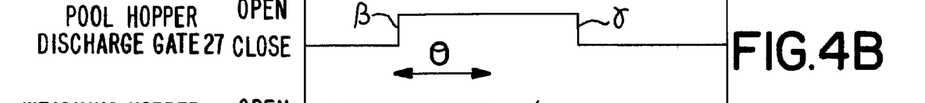
Figure 4C:
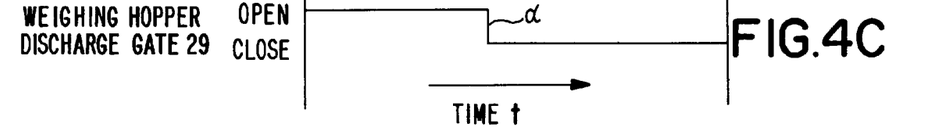

FIG. 4 shows operation timings of the vibrating system 1 (FIG. 4A), the discharge gate 27 of the pool hopper (FIG. 4B) and the discharge gate 29 of the weighing hopper 28 (FIG. 4C). Referring to FIG. 4C, when the combinational computation has been performed, the discharge gate 29 of the weighing hopper 28 is opened to discharge the articles 52 in FIG. 1, and the discharge gate 29 is then closed at the time α.

Referring to FIG. 4B, because there is a fall time Θ during which articles fall from the pool hopper 26 to the weighing hopper 28, the discharge gate 27 of the pool hopper 26 is opened at timing β which is earlier by the fall time Θ than the time α when the discharge gate 29 is closed. The discharge gate 27 is closed at time γ after discharging the articles 52 stored in the pool hopper 26 therefrom.

Similarly, referring to FIG. 4A, because there is a fall time φ during which articles fall from the vibrating feeder 1b to the pool hopper 26, the vibrating feeder 1b is started at time ∈ (t0 in FIG. 3) which is earlier by fall time Φ than the time γ. The vibrating feeder system 1 is stopped at time λ (t1 in FIG. 3).

Thus, the discharge gate 27 of the pool hopper is open for part of the time during which the discharge gate 29 of the weighing hopper is also open, and the vibrating feeder 1b is started to vibrate when the discharge gate 27 of the pool hopper is open. This increases the overlap between the operation timing of the vibrating feeder 1b and the timings for opening/closing the discharge gate 27 of the pool hopper in order to obtain sufficient feed amount of the vibrating feeder 1.

When Vibrating Feeder System 1 is Started

FIG. 6 shows states in controlling the firing angles of the feed-voltage. Referring to FIG. 6A, at start time e the controller 60 outputs a starting signal shown in FIG. 6E to firing angle control device 10. Immediately after start time ∈ the firing angle control device 10 receives a zero-cross signal 40 and, after an amount of time determined by the firing angle, outputs a firing signal 42. This causes the SSR 4 to switch ON. The firing angle control device is adopted to output a firing signal 42 after every other zero-cross signal, i.e., after zero-cross signals 40 and 45 (labelled A), but not after zero-cross signals 46 and 47 (labelled B). It is noted that in FIG. 6A, the load current is phase shifted from the load voltage because the electromagnet 3 (FIG. 2) of the vibrating mechanism 1a includes a coil which is an inductive load. Meanwhile, the SSR 4 continues to permit the flow of current until it becomes zero even if the firing signal 42 is turned OFF. Thus the SSR 4 is actually ON until the current becomes zero as shown in FIG. 6B. The drive signal voltage is indicated by the hashed portions of FIG. 6A. FIG. 6D shows zero-cross signals caused by successive zero-crossings of the power supply voltage, as detected by the zero-cross detecting device 16. The power per cycle delivered to the vibrating mechanism is substantially proportional to the length of the ON period of the SSR 4.

FIGS. 7A, 7B, 7C, 7D and 7E illustrate an alternative example when the firing angle is increased from the firing angle illustrated in FIGS. 6A, 6B, 6C, 6D and 6E. As a result, the firing signal 43 is delayed in comparison to the firing signal 42, and the power delivered by the SSR 4 is reduced.

FIGS. 8A, 8B, 8C, 8D and 8E illustrate the situation when the start time ∈ occurs before a positive-to-negative zero-cross signal 44. In this case, the current pulse 50 is negative, but the force exerted by the electromagnet 3 on the iron core is still attractive over the ON cycle of the SSR 4.

Figure 5A:
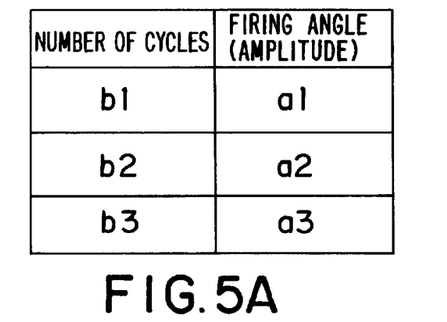
FIGS. 5A, 5B and 5C are tables showing firing angle control patterns in starting the vibrating feeder.
Figure 5B:
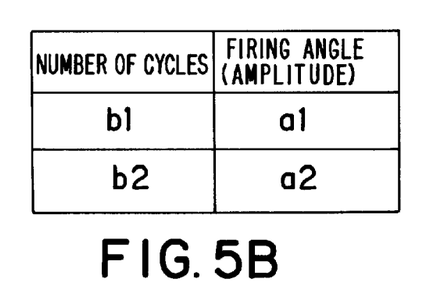
Figure 5C:
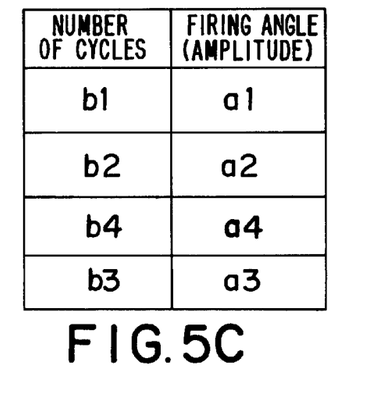
Figure 6A:
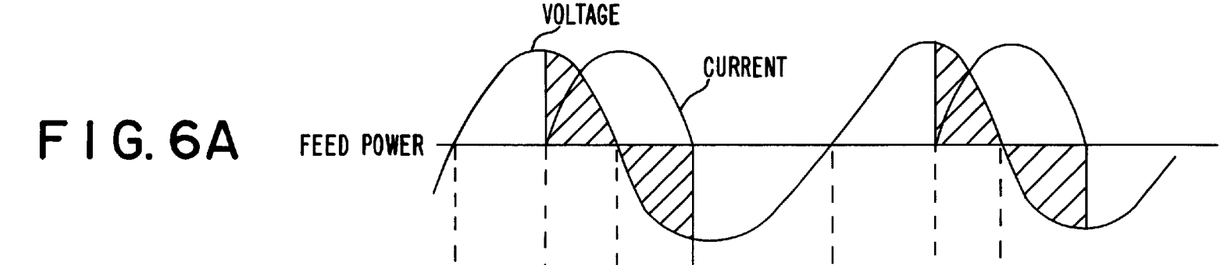
FIG. 6A is a graph illustrating the power supply signal voltage, the load current and the drive signal voltage.
Figure 6B:
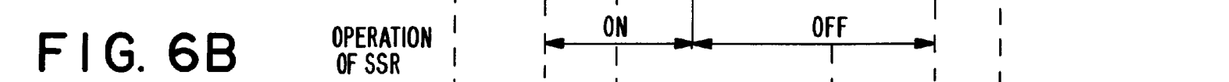
FIG. 6B illustrates the ON/OFF periods of the switch.
Figure 6C:
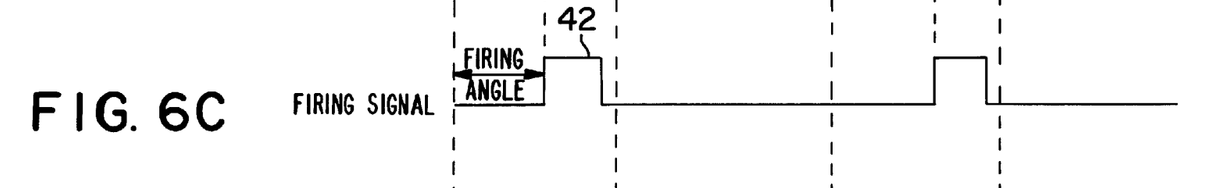
FIG. 6C illustrates the firing signal output by the firing angle control device.
Figure 6D:
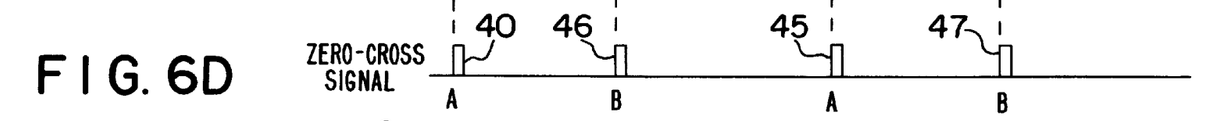
FIG. 6D illustrates the zero-cross signal output by the zero-cross detecting device.
Figure 6E:
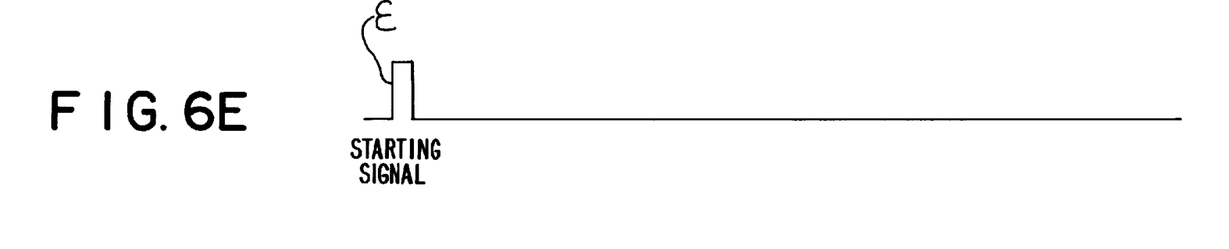
FIG. 6E illustrates the staring signal output by a controller.
Figure 7A:
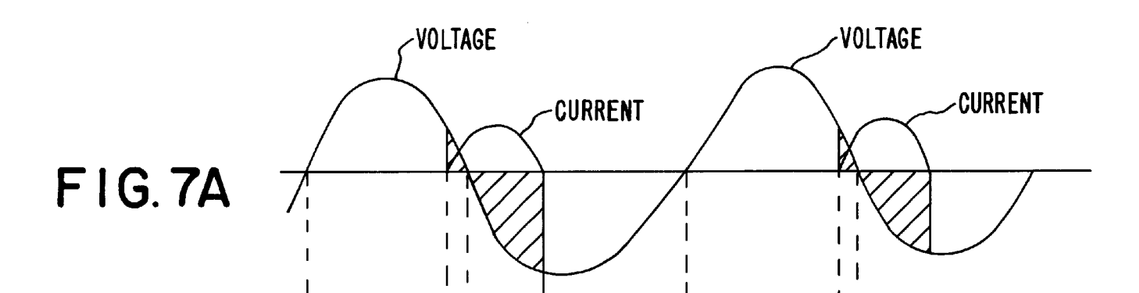
FIGS. 7A, 7B, 7C, 7D and 7E show corresponding signals with a delayed firing angle.
Figures 7B, 7C:
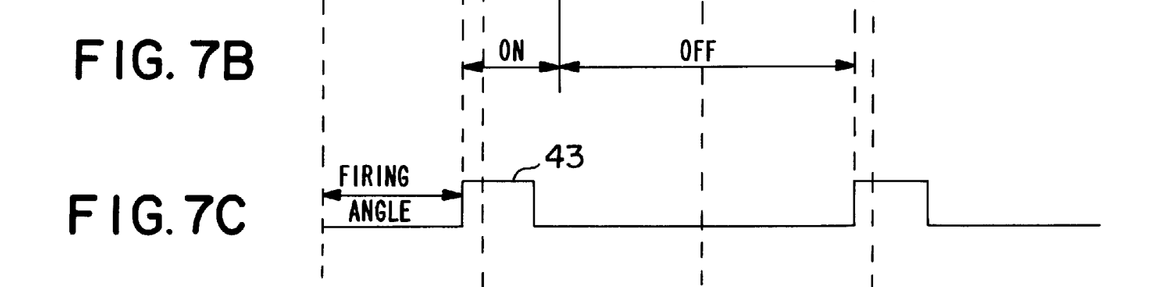
Figures 7D, 7E:
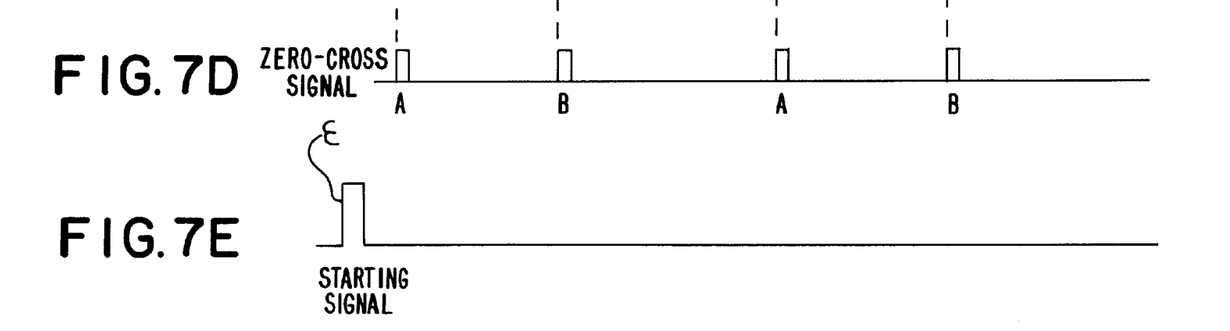
Figure 8A:
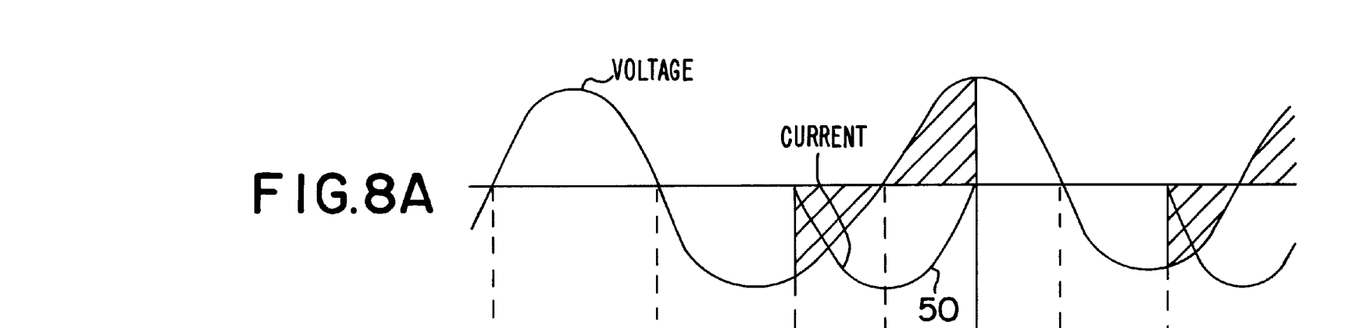
FIGS. 8A, 8B, 8C, 8D and 8E illustrate a further alternative in which the time e falls before a positive-to-negative zero-cross signal.
Figures 8B, 8C:
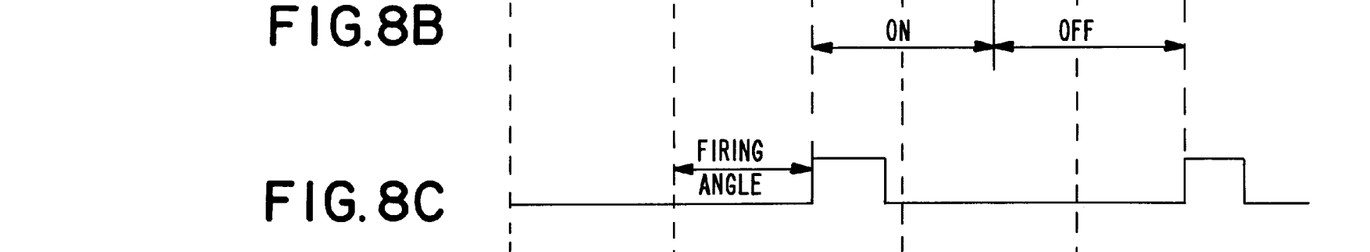
Figure 8D:
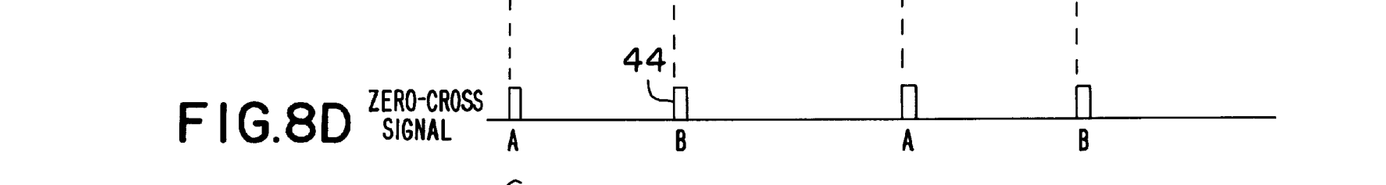
Figure 8E:
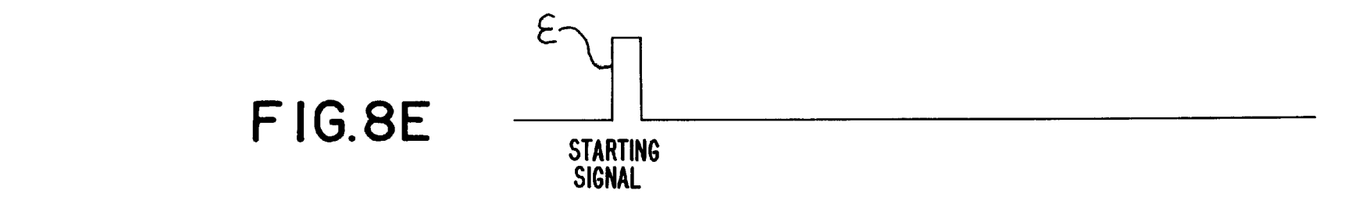

After receiving a starting signal output from the controller 60 of the whole weighing equipment at the above-mentioned timing ∈, the firing angle control device 10 in FIG. 2 reads the control pattern from the control pattern storage device 12 and resets the cycle counter 6. Then, it sends a firing signal to the SSR 4 according to the control pattern and receives a count input from the cycle counter 6 to monitor timings for switching the control pattern in which each number of cycles is set respectively. When the switching timing comes, it resets the counter 6 and switches to the next control pattern to send a firing signal to the SSR 4 in accordance with that control pattern. The SSR 4 turns ON/OFF based on the transmitted firing signal to control the power fed to the vibrating mechanism 1a. FIG. 5 shows three examples of this control pattern. The pattern control operation of the firing angle control device 10 will be explained below with reference to FIGS. 9 and 5.

Figure 9:
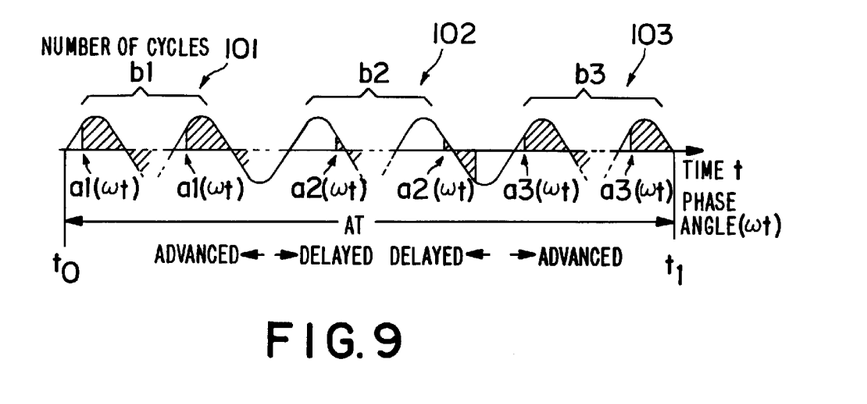
FIG. 9 is a chart showing a state in controlling firing angles of a feed-voltage.

FIG. 9 illustrates the power supply signal voltage and the drive signal voltage (hashed portions) during a drive period AT. In FIG. 9, the firing angle control device 10 first reads a first firing angle a1 and a first number of cycles b1 from the control pattern in FIG. 5A. That is, as shown by 101 in FIG. 9, it controls the drive signal fed to the vibrating mechanism 1a across the first number cycles b1 (e.g. 4 times) corresponding to a count input from the cycle counter 6 at the first firing angle a1. Next, as shown by 102 in FIG. 9, the drive signal is controlled across a second number of cycles b2 (e.g. 4 times) at a second firing angle a2 which is delayed from the first firing angle a1. Following that, as shown by 103 in the figure, the drive signal is controlled across a predetermined number of cycles b3 at a third firing angle a3 which is advanced from the second firing angle a2.

The resulting amplitude of vibration of the vibrating feeder 1b is shown in FIG. 3A. The vibrating feeder system 1 is driven at first over b1 cycles with a firing angle a1. The numbers a1 and b1 are suitably chosen such that the amplitude of vibration approaches the target amplitude after b1 cycles. Because the firing angle a1 corresponds to a steady-state amplitude around or higher than the target amplitude C, the amplitude of the vibrating feeder 1b increases quickly. Following that, it is driven over b2 cycles with a firing angle a2, where a2 corresponds to a steady-state amplitude which is less than the target amplitude C to suppress overshoot. Thereafter, it is driven at the firing angle a3 (third level of the drive signal power) which corresponds to the steady-state target amplitude C not to cause any overshoot again. Thus, when the amplitude of the vibrating feeder 1b is controlled by the control pattern, it is suppressed or maintained within the target amplitude C without causing any overshoot which is otherwise caused in the past as shown in FIG. 3B (PRIOR ART). It is noted that the firing angles a1 through a3 in controlling the drive signal are increased/decreased corresponding to an amount of the articles 52 to be put into the pool hopper 26 in FIG. 1.

FIGS. 5B and 5C illustrate alternative control patterns. The fourth firing angle a4 is advanced from the second firing angle a2.

Due to lack of overshoot, the mechanical strength of the vibrating feeder system 1 does not need to be increased as in the past. It is noted that the distributing feeder 25 may also be controlled in the same manner as the vibrating feeder 1b so as to reduce the mechanical strength thereof.

When Vibrating Feeder System 1 is Stopped

Figures 10A, 10B:
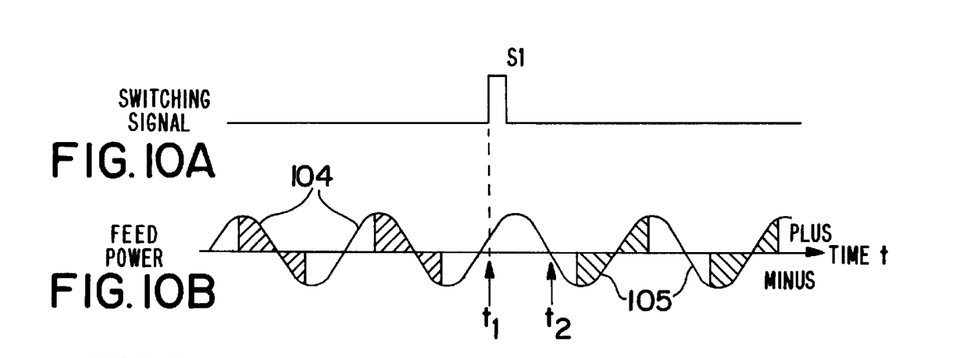
FIGS. 10A, 10B and 10C are charts showing a state in controlling the feed-voltage when the vibrating feeder is stopped.
Figure 10C:
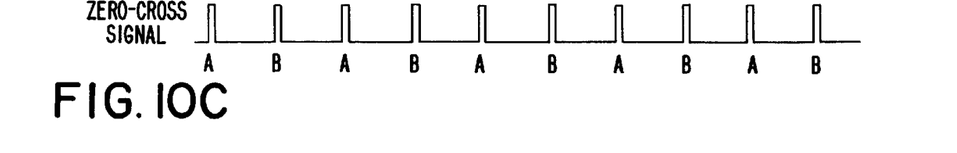

Next, a case when the vibrating feeder 1b is stopped will be explained with reference to FIG. 10. Hitherto, the vibrating feeder 1b has been left to natural attenuation of vibration when it is to be stopped. However, in the combination weighing equipment illustrated in FIG. 1, it is necessary to reduce the amplitude of the vibrating feeder 1b immediately after a drive period AT in order to fix the amount of articles 52 to be supplied and to improve the weighing accuracy. The drive signal is controlled in the present system so as to quickly reduce the amplitude of the vibrating feeder 1b when it is to be stopped. The operation of the vibrating feeder 1b when it is to be stopped will be explained below.

When the vibrating feeder 1b has fed a predetermined amount of the articles 52 to the pool hopper 26, its vibrating operation is to be stopped (t1 in FIG. 3). At this time the controller 60 sends a stopping signal to firing angle control device 10. On receipt of the stopping signal, the firing angle control device 10 sends a switching signal S1 to the opposite phase switching device 18. On receipt of switching signal S1 the opposite phase switching device 18 commands the cycle counter 6 to count the opposite signal, for example from A to B. Thus, from time t2 the cycle counter 6 and firing angle control device 10 switch to an opposite phase, i.e., the cycle counter 6 counts every positive-to-negative zero-cross signal B and the firing angle control device 10 outputs a firing signal after every positive-to-negative zero-cross signal B.

As a result, after time t2 the phase of the drive signal is opposite from that of the drive signal when it is driven in the drive period AT. After a predetermined number of opposite phase cycles (for instance two or three cycles) the firing angle control device 10 then stops sending firing signals.

Because the SSR 4 reverses the phase of the drive signal immediately after t1, the vibrating feeder 1b is applied with energy which causes the vibrating feeder to vibrate with the opposite phase from that during driving, thus attenuating the vibration rapidly.

Thereby, as shown by 106 in FIG. 3A, the amplitude of the vibrating feeder 1b which has been C at the time of driving is reduced to C/4 immediately after the stop thereof, so that the vibrating feeder 1b will not feed articles 52 to the pool hopper 26 by the remaining attenuating vibration after time t1. It is noted that a number of fine wave crests represents a number of times of vibration. Further, because the vibrating feeder 1b, which has been attenuated naturally in the past as shown in FIG. 3B, is quickly attenuated, the attenuation time is shortened and the weighing speed may be improved.

It is noted that when the vibration cannot be attenuated quickly by sending two or three opposite phase signals, because the target amplitude value of the vibrating feeder 1b is high and the amplitude is large, more opposite phase signals may be transmitted.

Figure 11:
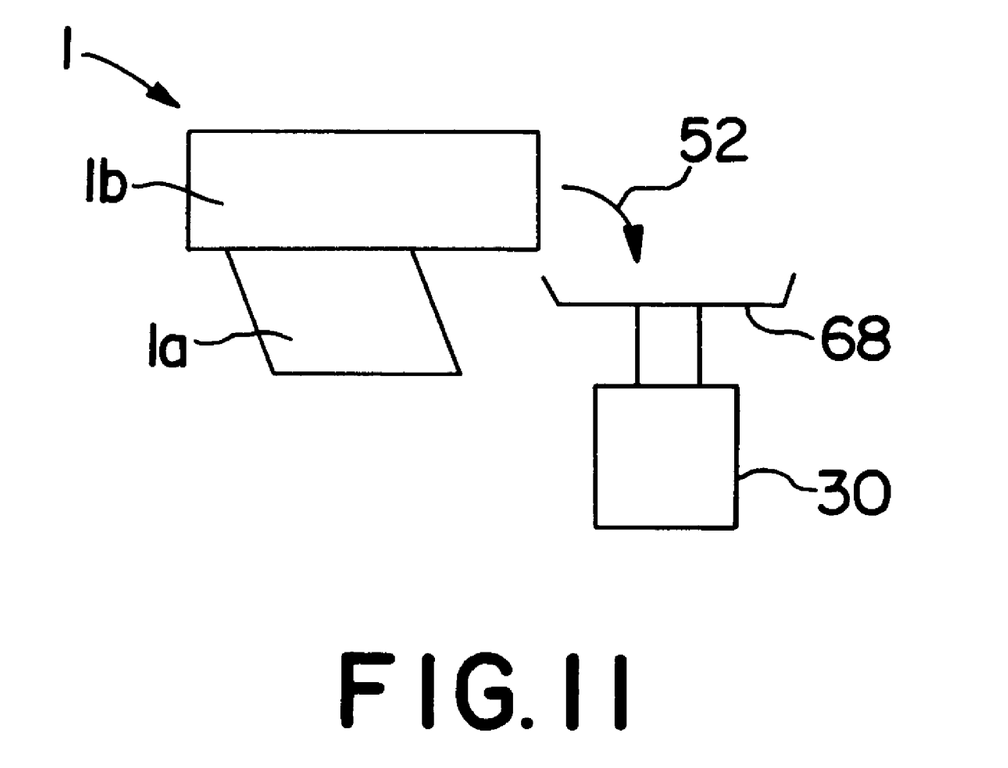
FIG. 11 is a side view showing weighing equipment using the controller of the vibrating feeder according to another embodiment of the present invention.

Although the apparatus has been used in combination weighing equipment in the present embodiment, it may also be used for a vibrating feeder of balancing weighing equipment as illustrated in FIG. 11. As shown in FIG. 11, a fixed amount of articles 52 is obtained by detecting the weight of the articles 52 supplied to a weighing table 68 mounted on weight detecting device 30. The present invention allows a fixed amount of articles 52 to be supplied from the vibrating feeder 1b to the weighing table 68.

It is noted that although a commercial AC power supply 2 has been used in the present embodiment, a power supply having a predetermined frequency generated by an inverter may be also used. Also a pulsed current supply may be used.

Although preferred embodiments have been shown and described, it would be appreciated by those skilled in the art that changes may be made in these embodiments without departing from the principles and spirit of the invention, the scope of which is defined in the claims and their equivalents.

What is claimed is:

1. A method of controlling a vibrating feeder, comprising the steps of:

applying a drive signal to a vibrating mechanism connected to the vibrating feeder at a first predetermined power level; and subsequently applying the drive signal to the vibrating mechanism at a second predetermined power level which is greater than zero and lower than the first predetermined power level whereby an amplitude of vibration of the vibrating feeder converges towards a target amplitude, wherein the first predetermined power level corresponds to a steady-state amplitude of vibration of the vibrating feeder at or above the target amplitude and the second predetermined power level corresponds to a steady-state amplitude of vibration of the vibrating feeder below the target amplitude.

2. The method according to claim 1, wherein the drive signal is applied to the vibrating mechanism at the first and second predetermined power levels at a start of a drive period.

3. The method according to claim 1, wherein the first and second predetermined power levels are determined independently of a response of the vibrating mechanism to the applied drive signal.

4. The method according to claim 1, wherein the drive signal is generated by switching a power supply signal.

5. The method according to claim 1, wherein the drive signal is cyclical and is applied to the vibrating mechanism at the first predetermined power level over a predetermined number of cycles.

6. The method according to claim 1, wherein the drive signal is cyclical and is applied to the vibrating mechanism at the second predetermined power level over a predetermined number of cycles.

7. An apparatus for controlling a vibrating feeder connected to a vibrating mechanism, the apparatus comprising:
    a drive device to apply a drive signal to the vibrating mechanism at a first predetermined power level and to subsequently apply the drive signal to the vibrating mechanism at a second predetermined power level which is greater than zero and lower than the first predetermined power level whereby an amplitude of vibration of the vibrating feeder converges toward a target amplitude, wherein the first predetermined power level corresponds to a steady-state amplitude of vibration of the vibrating feeder at or above the target amplitude and the second predetermined power level corresponds to a steady-state amplitude of vibration of the vibrating feeder below the target amplitude.

8. The apparatus according to claim 7, further comprising:
    a switching element to switch a power supply signal to generate the drive signal; and
    a firing angle control device to control the power level by controlling the firing angle of the switching element.

9. The apparatus according to claim 8, further comprising a control pattern storage unit to store a control pattern wherein the firing angle control means controls the switching element in accordance with the control pattern.

10. A method of controlling a vibrating feeder, comprising the steps of:
    applying a drive signal, generated by switching a power supply signal, having a phase to a vibrating mechanism connected to the vibrating feeder at a first phase; and
    subsequently applying the drive signal to the vibrating mechanism at a second phase which is different from the first phase, whereby an amplitude of vibration of the vibrating feeder converges towards a target amplitude without the use of a feedback signal from the vibrating feeder and a switching element switching the power supply signal has a controlled firing angle controlling a power level of the power supply signal.

11. The method according to claim 10, wherein the drive signal is applied to the vibrating mechanism at the first and second phases when the vibrating feeder is to be stopped, and wherein the target amplitude is zero.

12. The method according to claim 10, wherein the first and second phases are determined independently of a response of the vibrating mechanism to the applied drive signal.

13. The method according to claim 10, wherein the second phase is offset by half a cycle from the first phase.

14. The method according to claim 10, wherein the drive signal is applied to the vibrating feeder at the second phase over a predetermined number of cycles.

15. An apparatus for controlling a vibrating feeder connected to a vibrating mechanism, the apparatus comprising:
    first drive means for applying a drive signal to the vibrating mechanism at a first phase, the first phase corresponding to a predetermined control pattern;
    second drive means for subsequently applying the drive signal to the vibrating mechanism at a second phase which is different from the first phase, whereby an amplitude of vibration of the vibrating feeder converges towards a target amplitude without the use of a feedback signal from the vibrating feeder;
    a switching element to switch a power supply signal to generate the drive signal; and
    firing angle control means for controlling the phase of the drive signal by controlling the firing angle of the switching element.

16. The apparatus according to claim 15, further comprising:
    zero-cross detecting means for detecting a zero-cross point of the power supply signal; and
    phase switching means for switching the phase of the drive signal in response to the detected zero-cross point.

* * * * *